United States Patent Office 3,594,188
Patented July 20, 1971

3,594,188
PREPARATION OF FROZEN PAR-FRIED
POTATOES
Charles C. Huxsoll, San Pablo, and Merle L. Weaver, Martinez, Calif., assignors to the United States of America as represented by the Secretary of Agriculture
No Drawing. Filed Apr. 2, 1969, Ser. No. 812,857
Int. Cl. A23l 1/00; B65b 55/16
U.S. Cl. 99—100P                                    2 Claims

ABSTRACT OF THE DISCLOSURE

Conventional frozen par-fried potatoes when prepared for the table rapidly lose their crispness and become limp and soggy. This problem is cured as described herein by applying a treatment with radiant heat before the potato strips are subjeced to the usual par-frying operation.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel procedures for preparing the product known in the industry as frozen par-fried potatoes, and which is termed less accurately by users in the home as frozen french fried potatoes. Further objects of the invention will be evident from the following description wherein parts and percentages are by weight unless otherwise specified.

In conventional practice, frozen par-fried potatoes are prepared as follows: Potatoes are peeled, trimmed, and cut into strips. The strips are washed to remove surface starch, drained, and fried in hot oil (about 390° F.) for 1 to 2 minutes. (In this short frying period, the surfaces of the strips are browned; interior portions are still largely uncooked. The cooking is completed later, when the products are prepared for the table.) The fried strips are then drained, packaged and frozen. The product may be prepared for the table in various ways; for example, in the home it is most convenient to spread the frozen strips on a pan and heat them in an oven (about 400–450° F.) until the potato material is cooked and ready for the table. In restaurants it is generally preferred to prepare the products for the table by frying them in hot fat.

Most restaurants including the large franchise chains prefer to prepare their french fried potatoes from the frozen par-fried product rather than to go through the cumbersome procedure of preparing french fries from raw potatoes. Although frozen par-fries offer convenience and savings in labor costs, one problem which has beset the industry is that when the products are prepared for the table (either by oven heating or by deep-fat frying), they are unstable as to texture. Immediately after removal from the oven or deep-fat fryer, the potato strips have a desirable crisp texture, but as they cool they become limp and soggy. This problem is particularly acute in large restaurant operations: Guests who receive the first portions of each batch enjoy french fries of desirable crisp texture, whereas others who receive subsequent portions of the batches can only contemplate with dismay the soggy, limp strips on their plates.

A primary object of the invention is the provision of procedures for preparing frozen par-fried potatoes which cure the problem outlined above.

A basic element in the process of the invention is that the potato strips—prior to the conventional par-frying operation—are subjected to a special surface treatment. This is carried out by exposing the strips to radiant heat supplied, for example, by a conventional radiant heater which provides an element brought to incandescence (i.e., at least 1200° F.) by electrical power or by combustion of propane or other gaseous or liquid fuel. Particularly preferred are the modern gas-fired devices used for heating patios, outdoor restaurants, etc. These heaters include a porous ceramic plate treated with a catalyst. Propane or natural gas is fed through the plate and burns over the entire surface thereof, bringing the plate to incandescence and thereby providing a large area from which radiant energy is uniformly emitted. Since radiant energy is effective only when a line of sight between source and the area to be heated is established, it is necessary to provide some arrangement to ensure that all points on the surfaces of the potatoes come into such relationship with the radiant source. For example, one may provide a drum within which is located a radiant heater. The potato strips are fed into the drum which is then rotated. As the drum rotates the strips roll and tumble about so that all surfaces thereof are exposed to the energy emitted by the radiant source. Another plan is to convey the strips under a bank of radiant elements while supported on a conveyor equipped with rollers, vibrators, or other suitable means to roll or tumble the strips about so uniform exposure of all surfaces will be attained. Regardless of the type of equipment used, the exposure to radiant heat is continued for a period long enough to form a gelatinized crust on the surfaces of the strips. This crust is readily noticeable by its translucent appearance. Also, it is generally harder than the raw tissue and its formation can also be determined by feeling the strips from time to time as they are being irradiated. When the gelatinized crust is formed, the strips are ready for the next step, i.e., par-frying. It is to be emphasized that the irradiation should not be continued so long as to cause the strips to be blistered nor to become brown. Usually for best results, it is preferred to continue the irradiation until the crust is formed and the surfaces are just at the point of beginning to form blisters.

A particular advantage of the invention is that when our products are prepared for the table they will remain crisp. In other words, our invention obviates the sogginess problem which is common to conventional frozen par-fried potatoes. Another item of advantage is that the products of the invention tend to absorb a lesser amount of oil when they are par-fried. This, of course, signifies a saving in oil consumed in this operation. Moreover, in addition to securing the advantages outlined above there is no sacrifice in taste; the products of the invention when prepared for the table cannot be distinguished from french fries produced from good quality frozen par-fries or even those prepared by direct frying of raw potato strips.

In applying the principles of the invention to prepare frozen par-fried potatoes, the following steps are applied:

(a) Raw potatoes are peeled, trimmed, and cut into strips in conventional manner.

(b) The potato strips are then preferably washed—by flushing with sprays of water, for example—to remove surface starch.

(c) The strips are exposed to radiant heat as explained hereinabove.

(d) The so-treated strips are next par-fried in conventional manner. For example, they are immersed in hot (about 390° F.) cooking oil for about 1 or 2 minutes so their surfaces are evenly browned.

(e) The par-fried strips are then subjected to the usual steps of freezing and packaging. The product is maintained in frozen storage until ready to be consumed.

When it is desired to consume the frozen par-fries they are heated in an oven or in hot oil as in conventional practice. One of the added advantages of our invention is that standard preparation for the table is used so that our products can be integrated into existing restaurant cooking schedules without requiring any changes or new equipment.

EXAMPLE

The invention is further demonstrated by the following illustrative example.

Russet Burbank potatoes were peeled, trimmed, and cut into strips 3/8" x 3/8" x 4".

The strips were washed to remove surface starch.

The washed strips were placed on a surface and exposed to radiation from a propane-fried, infra-red heater having a surface temperature of 1500–1600° F. The heater was positioned so that the hot ceramic face of the heater was 9 or 10 inches above the strips. During the radiation treatment, the strips were turned at intervals so that all major surfaces were exposed to the same degree. The time of irradiation was 2 to 6 minutes. In all cases, it was observed that the strips had a translucent appearance due to formation of a crust of gelatinized potato tissue. With those samples heated to 6 minutes, the surface was just on the point of starting to blister.

The strips, still hot from the irradiation, were par-fried in hot (390° F.) fat for 2 minutes.

The par-fried strips were drained, frozen in a blast freezer at minus 30° F., packaged, and placed in frozen storage (minus 10° F.).

The product was kept under such conditions of frozen storage for about 4 months, then prepared for the table and tested by the methods detailed below.

In a control run, the treatment with the infra-red heater was omitted; other treaments were identical to those described above.

Preparation for the table: The frozen strips were spread on trays and heated for 15 minutes in an oven at 435° F. The resulting products, now in condition for consumption, were tested by the technique described below.

Crispness test: Equipment was set up comprising a platform and clamping means so that a single potato strip could be held on the edge of the platform with 3.5" of its length projecting horizontally into space. A protractor was arranged so that the angle of deflection (sag) of the strip could be measured. In this test, a small angle of deflection indicates a crisp strip, a large angle indicates a limp strip. In order to correlate the assay with conventional serving practice, the tests were performed as follows: Fifteen strips (representing one batch prepared by a particular method) were removed from the oven, allowed to stand at room temperature. After 5 minutes of standing three of the strips were tested for crispness, after 6 minutes of standing another three of the strips were tested, and so on until all fifteen had been tested. The fifteen deflection measurements for each processing variable were then averaged.

Samples from each run were also analyzed for fat content.

The results are tabulated below.

| Run | Processing variables | | Properties of product | |
|---|---|---|---|---|
| | Height of IR heater above strips, inches | Time exposed to IR heater, minutes | Crispness, angle of deflection (sag), deg. | Ratio of fat content to potato solids |
| 1 (control) | (¹) | (¹) | 20 | 20 |
| 2 | 9 | 2 | 11 | 20 |
| 3 | 10 | 2 | 7 | 18 |
| 4 | 9 | 4 | 5 | 17 |
| 5 | 10 | 4 | 3 | 17 |
| 6 | 10 | 6 | 3 | 16 |

¹ Not used.

Having thus described the invention, what is claimed is:
1. A process for preparing frozen par-fried potatoes, which consists of
   (a) cutting peeled potatoes into strips,
   (b) washing the strips to remove surface starch,
   (c) exposing the washed strips to radiant heat emitted from an incandescent element for a period long enough to form a gelatinized crust on the surfaces of the strips but not long enough to cause blistering or browning,
   (d) par-frying the so-treated strips in hot fat for a period long enough to brown the surfaces, and
   (e) freezing the par-fried strips and holding them in frozen storage.
2. The process of claim 1 wherein, in step (c), the strips are tumbled about while exposed to the radiant heat, whereby to ensure uniform treatment of the surfaces of the strips.

References Cited

UNITED STATES PATENTS

| 3,175,914 | 3/1965 | Vahising | 99—100 |
| 3,256,101 | 6/1966 | Arns | 99—221 |
| 3,365,301 | 1/1968 | Lipoma et al. | 99—100 |
| 3,397,993 | 8/1968 | Strong | 99—100 |
| 2,308,601 | 1/1943 | Georg | 99—217 |
| 2,575,426 | 11/1951 | Parnell | 99—217 |
| 3,494,724 | 2/1970 | Gray | 99—217 |

NORMAN YUDKOFF, Primary Examiner

H. H. BERNSTEIN, Assistant Examiner

U.S. Cl. X.R.

99—103, 218